United States Patent
Sharma (10) Patent No.: US 10,152,547 B2
(45) Date of Patent: Dec. 11, 2018

(54) PATTERN MATCHING FOR CONTENT IN DIGITAL MAGAZINE

(71) Applicant: Flipboard, Inc., Palo Alto, CA (US)

(72) Inventor: Vaibhav Sharma, Mountain View, CA (US)

(73) Assignee: Flipboard, Inc., Palo Alto, CA (US)

( * ) Notice: Subject to any disclaimer, the term of this patent is extended or adjusted under 35 U.S.C. 154(b) by 240 days.

(21) Appl. No.: 15/017,241

(22) Filed: Feb. 5, 2016

(65) Prior Publication Data

US 2017/0228463 A1    Aug. 10, 2017

(51) Int. Cl.
*G06F 17/30* (2006.01)

(52) U.S. Cl.
CPC .... *G06F 17/30867* (2013.01); *G06F 17/3053* (2013.01); *G06F 17/30528* (2013.01); *G06F 17/30551* (2013.01); *G06F 17/30554* (2013.01); *G06F 17/30598* (2013.01)

(58) Field of Classification Search
CPC ......... G06F 17/30867; G06F 17/30528; G06F 17/3053; G06F 17/30551; G06F 17/30554; G06F 17/30598
USPC ....................................................... 707/725
See application file for complete search history.

(56) References Cited

U.S. PATENT DOCUMENTS

| | | | |
|---|---|---|---|
| 8,554,640 B1* | 10/2013 | Dykstra | G06Q 10/101 705/14.49 |
| 9,383,965 B1* | 7/2016 | Qureshi | G06F 3/04847 |
| 2004/0199923 A1* | 10/2004 | Russek | G06F 17/30265 719/310 |
| 2010/0205541 A1* | 8/2010 | Rapaport | G06Q 10/10 715/753 |
| 2011/0289088 A1* | 11/2011 | Yarin | G06F 17/30781 707/738 |
| 2012/0042263 A1* | 2/2012 | Rapaport | G06Q 30/02 715/753 |
| 2013/0085828 A1 | 4/2013 | Schuster | |
| 2013/0262966 A1* | 10/2013 | Wu | G06F 17/30867 715/202 |
| 2014/0019446 A1 | 1/2014 | He et al. | |
| 2014/0074934 A1* | 3/2014 | van Hoff | G06F 17/3053 709/204 |

(Continued)

OTHER PUBLICATIONS

PCT International Search Report and Written Opinion for PCT/US2017/014603, dated Apr. 6, 2017, 11 Pages.

*Primary Examiner* — Thanh-ha Dang
(74) *Attorney, Agent, or Firm* — Fenwick & West LLP (57) ABSTRACT

A digital magazine server logs user interactions with content provided by the server, including the topic of the content and time of the interaction by the user. For each user of the server, the server segments the time interval (e.g., a day) of the user's interactions with content into time periods, e.g., fixed time periods or automatically determined time periods, and ranks topics of interest for each time period. The server also obtains a list of topics that each user interacted with each day. The digital magazine server uses a time segmentation module based on content interaction data and associated timing information from the users of the server. Upon receiving a request for content from a user, the digital magazine server ranks the content for display to the user based on the match between the content and the ranked topics for the user during the current time associated with the request.

20 Claims, 8 Drawing Sheets

(56) References Cited

U.S. PATENT DOCUMENTS

| | | | |
|---|---|---|---|
| 2014/0075275 A1* | 3/2014 | Aleksandrovsky | ........................ G06F 17/2229 715/202 |
| 2014/0198127 A1* | 7/2014 | Ying | ........................ G06T 11/60 345/600 |
| 2014/0351268 A1* | 11/2014 | Weskamp | ............. G06F 17/217 707/748 |
| 2015/0142899 A1 | 5/2015 | Birney et al. | |
| 2015/0143394 A1* | 5/2015 | Hijikata | ........... H04N 21/45457 725/14 |
| 2015/0248683 A1 | 9/2015 | Walkingshaw | |
| 2017/0206551 A1* | 7/2017 | Gupta | ................. G06Q 30/0254 |
| 2017/0220580 A1* | 8/2017 | Chi | ..................... G06F 17/3053 |

* cited by examiner

PATTERN MATCHING FOR CONTENT IN DIGITAL MAGAZINE

BACKGROUND

The disclosure generally relates to providing digital content to a user of an online system, e.g., a digital magazine server, and more specifically to detecting patterns of user interactions with content provided by the digital magazine server and providing content on topics of interest to users based on the detected patterns.

Digital distribution channels disseminate a wide variety of digital content including text, images, audio, links, videos, and interactive media (e.g., games, collaborative content) to users. The increasingly popular computing devices, such as smart phones, tablet computers, and increased network bandwidth (for wired and wireless networks) have provided more communications platforms for users to search and consume digital content. However, users can be overwhelmed by the broad and unfiltered digital content available to users. Existing techniques for recommending digital content to users are based on previous interactions by users with an online system, such as a social networking system, without taking into account repeating patterns of user interaction with content such as topics of content and time when users engaged with the content. However, these conventional techniques often fail to present users with meaningful content on topics likely to be of interest to users at the specific time the content is requested. Additionally, while some existing online systems manually curate digital magazine cover pages with content of interest to a user, these manually curated cover pages often fail to accommodate the dynamically changing interests of the user and the diverging topics in the digital content items.

SUMMARY

An online system, such as a digital magazine server, logs user interactions with content provided by the system, including the topic of the content and time of the interaction by the user. For each user of the digital magazine server, the server obtains a list of topics interacted by the user for each day, segments the day into time periods, e.g., fixed time periods or automatically determined time periods, and ranks the topics for each time period. Upon receiving a request for content by a user, the digital magazine server ranks the content for the user based on the match between the ranked content and the topics of interest for the user during the current time associated with the request.

In one embodiment, the digital magazine server uses data gathered from user profiles and login records relating to a particular user's login times and historical reading data of the user over a period of time (e.g., a week), and detect the content interaction patterns of the user over the period of time. A user's content interaction patterns indicate reading habits of the user (e.g. what topics are of interest to the user) over a period of time. The digital magazine server can predict likely topics of interest for the user based on the user's interactions with content over a time interval of a day. For example, the digital magazine server segments the time interval of the day into smaller time periods, and represents the content interaction patterns by associating different lists of topics of interest with different time periods. Detected patterns of interaction are stored as reading habits data associated with users of the digital magazine server for a time segmentation module of the digital magazine server to segment a time interval into one or more time periods.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

System Environment Overview

A digital magazine server logs user interactions with content provided by the digital magazine server, including the topic of the content and time of the interaction by the user. For each user of the digital magazine server, the digital magazine server segments the time of the content interactions (e.g., a day) into time periods, e.g., fixed time periods or varying time periods automatically determined by the digital magazine server, and ranks the topics for each time period. In some embodiments, topics of content with which a user interacts are ranked based on predicted user interest patterns and content items are selected and presented to the user in a personalized digital magazine format based on the ranking.

In one embodiment, the digital magazine server uses data gathered from a user profile store and a reading data store storing login records relating to a particular user's login times and historical reading data of the user over a period of time (e.g., a week), and detects the content interaction patterns of the user over the period of time. A user's content interaction patterns indicate reading habits of the user (e.g. what topics are of interest to the user) over a period of time. The digital magazine server can predict likely topics of interest for the user based on the user's interactions with content over a time interval of a day. For example, the digital magazine server segments the time interval of the day into smaller time periods, and represents the content interaction patterns by associating different lists of topics of interest with different time periods. Detected patterns of interaction can be stored as reading habits data associated with the user in the reading data store or in the user profile store for a time segmentation module to segment a time interval into one or more time periods.

A "digital magazine" herein refers to an aggregation of digital content items that can be presented to users in a presentable format similar to the format used by print magazines. A "content item" or "article" herein refers to any machine-readable and machine-storable work product, such as textual articles, pictures/images, videos, user-generated content (e.g., content posted on a social networking system), advertisements, and any other types of digital content capable of display within the context of a digital magazine. In one embodiment, a digital magazine assembles a list of universal resource locators (URLs), where each article of the digital magazine is based on the content of a resource on the Internet to which a URL of the list of the URLs references to.

Figure 1:
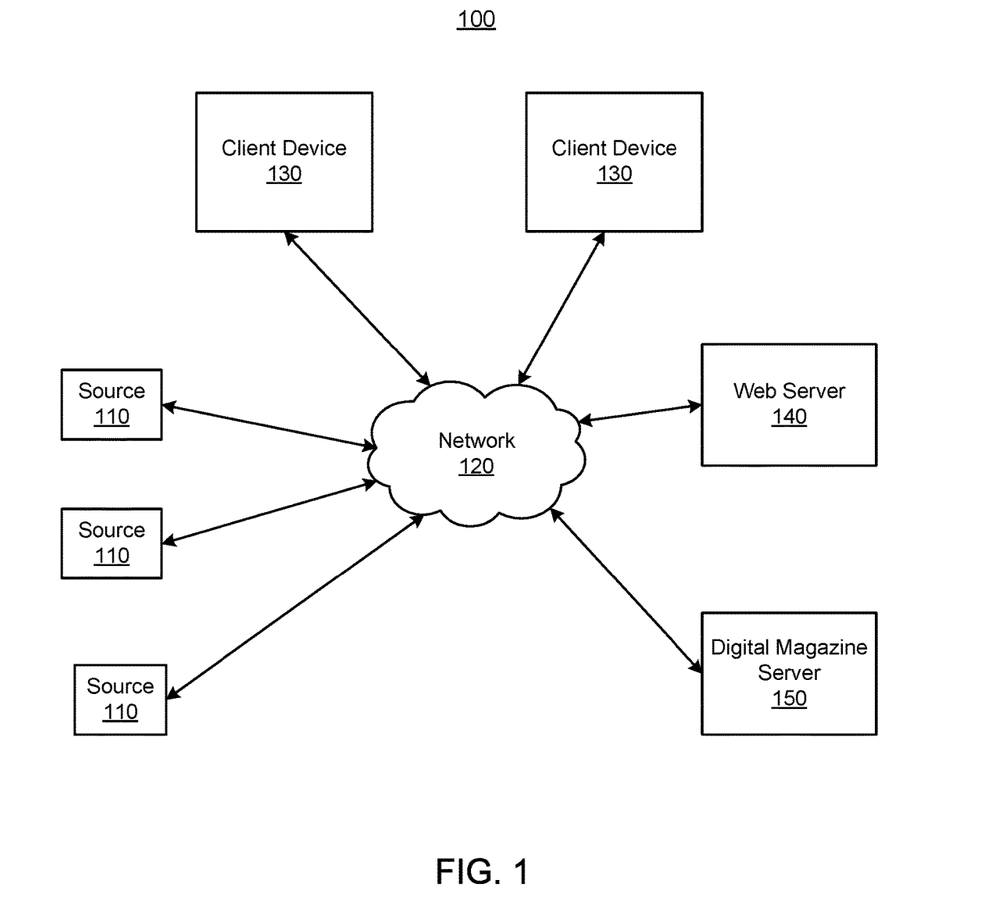
FIG. 1 is a block diagram of a system environment in which a digital magazine server operates, according to one embodiment.

FIG. 1 is a block diagram of a system environment 100 in which a digital magazine server operates, according to one embodiment. The system environment 100 shown by FIG. 1 includes one or more sources 110, a network 120, one or more client devices 130, a web server 140 and a digital magazine server 150. Only three sources 110, two client devices 130, one web server 140 and one digital magazine server 150 are shown in FIG. 1 in order to simplify the description. Embodiments of the system environment 100 can have many resources 110, client devices 130, web servers 140 and digital magazine servers 150 connected to the network 120. Likewise, the functions performed by the various entities of FIG. 1 may differ in different embodiments. The embodiments described herein can be adapted to online systems that are not digital magazine servers 150.

A source 110 is a computing system capable of providing various types of digital content to a client device 130 and a digital magazine server 150. Examples of content provided by a source 110 include text, images, video, or audio on web pages, web feeds, social networking information, messages, or other suitable digital data. Additional examples of content include user-generated content such as blogs, tweets, shared images, videos or audios, social networking posts, and social networking status updates. Content provided by a source 110 may be received from a publisher and distributed by the source 110; alternatively, a source 110 may be a publisher of content it generates. For convenience, content from a source 110, regardless of its composition, is referred to herein as an "article," a "content item," or as "content." A content item may include various types of content elements such as text, images, video, interactive media, links, and a combination thereof.

The sources 110 communicate with the client device 130 and the digital magazine server 150 via the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.1, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is a computing device capable of receiving user input as well as transmitting and/or receiving digital data via the network 120. Various embodiments of the client device 130 include a conventional computer system, such as a desktop or a laptop computer, and a device having computer functionality, such as a personal digital assistant (PDA), mobile telephone, smartphone, or any other suitable device. In one embodiment, the client device 130 executes an application allowing a user of the client device 130 to interact with the digital magazine server 150. For example, an application executing on the client device 130 communicates instructions or requests for content items to the digital magazine server 150. The client device 130 also executes a browser that receives pages from the digital magazine server 150 and presents the pages to a user of the client device 130. In another embodiment, the client device 130 interacts with the digital magazine server 150 through an application programming interface (API) running on a native operating system of the client device 130, such as IOS® or ANDROID™.

Different client devices 130 may have different characteristics such as different processing capabilities, different connection speeds with the digital magazine server 150 over the network 120, and different device types (e.g., make, manufacture, version). For example, in one embodiment, a client device 130 includes a display device (not shown) and an input device (not shown). A display device included in the client device 130 presents content items to a user of the client device 130. An input device included in the client device 130 receives input from a user of the client device 130. The user input is processed by a digital magazine application executing on the client device 130 to allow the user to interact with content items presented by the digital magazine server 150.

The web server 140 is a computer system that process requests based on network protocols, e.g., HTTP. In one embodiment, the web server 140 links the digital magazine server 150 via the network 120 to the one or more client devices 130, as well as to the one or more sources 110. The web server 140 serves web pages as well as other digital content to the digital magazine server 150 and communicates instructions to a client device 130 for generating pages of content items in a suitable presentation style/format for presentation to a user of the client device 130. In the embodiment shown in FIG. 1, the web server 140 is a network entity separate from the digital magazine server 150. In other embodiments, the web server 140 is a component of the digital magazine server 150.

The digital magazine server 150 records user interactions with content provide by the digital magazine server 150 over a period of time, e.g. a day, segments the time of the user interactions into fixed or varying time periods and ranks the topics for each time period. In one embodiment, to rank the topics for each time period, the digital magazine server 150 determines patterns of user interactions with content of a digital magazine based on past content consumption by the user, predicts likely topics of interest for the user based on the determined patterns and other factors such as current time, selects content items on the likely topics of interest to the user and presents the selected content items in a digital magazine format to the user. For example, in response to a user request or interaction with a digital magazine application executing on a client device 130 of the user, the digital magazine server 150 determines one or more topics which are of interest to the user at the time of the request based on previously generated user interaction patterns with digital magazine content, and selects a threshold number of content items related to the topics of interest for the user at the time of the request.

Example Digital Magazine Server

Figure 2:
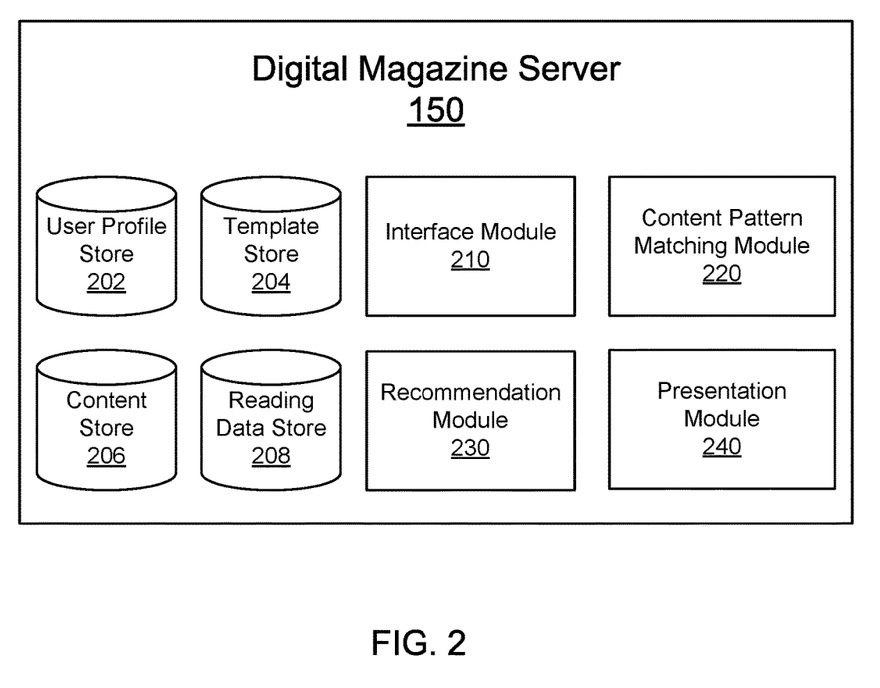
FIG. 2 is a block diagram of an example digital magazine server according to one embodiment.

FIG. 2 is a block diagram of an example digital magazine server 150 according to one embodiment. In the embodiment of FIG. 2, the digital magazine server 150 includes a user profile store 202, a template store 204, a content store 206, a reading data store 208, an interface module 210, a content pattern matching module 220, a recommendation module 230, and a presentation module 240. In other embodiments, the digital magazine server 150 may include additional, fewer, or different entities for various applications.

The user profile store 202 stores user profiles of users of the digital magazine server 150. Information stored in a user profile may include biographic, demographic (e.g., age, gender, occupation, education, socioeconomic status), and other types of information, such as gender, hobbies or preferences, location (e.g., residence, birthplace, check-in locations), or any other suitable information. The user profile store 202 may also include information for accessing one or more online networking systems or other types of sources (e.g., a user name, a password, an access code) that a user has authorized the digital magazine server 150 to access. In some configurations, user profiles within user profile store 202 also store login records for the user, indicating when the user was logged in to or using a service provided by digital magazine server 150, or otherwise interacting with digital magazine server 150 (e.g., viewing an article on the topic of global warming). Login records relating to a particular user's login times or other relevant data stored within the user profile store 202, such as how long the user stayed logged in and actions on the content items taken by the user, can be accessed for analysis by other modules of the digital magazine server 150.

The template store 204 stores page templates, each of which describes a spatial arrangement ("layout") of content items relative to each other on a page for presentation by a client device 130. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. The presentation module 240 selects a suitable page template from the template store 204 for presenting the content items recommended by the recommendation module 230 to a user of the digital magazine server 150.

The content store 206 stores objects that represent various types of digital content. In one embodiment, the objects are URLs, each of which references to a resource on the Internet. For example, the content store 206 stores content items received from one or more sources 110 (e.g., the resources referenced to by the URLs) within a threshold time of a current time, e.g., 6 months. Examples of content items stored by the content store 206 include page posts, status updates, photographs, videos, links, news articles, audios, check-in events at locations, or any other types of content. In some embodiments, each content object stored within content store 206 is associated with one or more topics.

Reading data store 208 stores interactions between users and digital content on various topics within the digital magazine server 150. Interactions may be represented within reading data store 208 by an interaction record containing various information about the interaction, e.g., an identification of a user associated with the interaction, one or more topics of the content interacted with by the user, a description of the interaction, and timing information of when the interaction occurred (e.g., a timestamp of the interaction). The description of the interaction may additionally include details about the type of interaction, for example, "viewing a content item associated with the topic," "subscribing to a digital magazine associated with the topic," "sharing a content item associated with the topic," or any other suitable interaction. An interaction object may also include any other suitable information, such as a measurement of the duration of the interaction, day of the week of the interaction, season of the interaction (e.g., basketball playoff season), or age of the interaction. In some embodiments, reading data store 208 only stores detailed interaction information for a set amount of time, for example, 1 year from the time of the interaction. Interactions recorded within the reading data store 208 relating to a particular user's reading history (i.e., "historical reading data" of the user) may be retrieved for analysis by the digital magazine server 150.

The interface module 210 controls and facilitates interactions between the client devices 130 and the digital magazine server 150 over the network 120. The interface module 210 can receive and process requests or queries for content from the client devices 110. In one embodiment, the interface module 210 receives user login information from the client device 110 and stores the timing information of each user login in the reading data store 208 or the user profile store 202.

The content pattern matching module 220 uses data gathered from the user profile store 202 and the reading data store 208, for example, login records relating to a particular user's login times and historical reading data of the user, to detect the content interaction patterns of the user. In one embodiment, a user's content interaction patterns indicate reading habits of the user (e.g. what topics are of interest to the user) over a period of time. For example, content pattern matching module 220 can predict likely topics of interest for a user based on the user's interactions with content over a time interval of a day. In this example, content pattern matching module 220 segments the time interval of the day into smaller time periods, and represents the content interaction patterns by associating different lists of topics of interest with different time periods. Detected patterns of interaction can be stored as reading habits data associated with the user in the reading data store 208 or in the user profile store 202. Further detail on one embodiment of the content pattern matching module 220 is described below with reference to description of FIG. 3.

The recommendation module 230 identifies likely content items of interest to a user at a given time. In the embodiment of FIG. 2, the recommendation module 230 uses the reading habits data and associated timing information created by the content pattern matching module 220 for identifying likely topics of interest to the user for the given time. For example, the recommendation module 230 ranks content for the user based on the match between the ranked content and the topics of interest for the user during the given time of day, and selects one or more content times based on the ranking for the user. The recommendation module 230 searches the content store 206 to find appropriate content items based on the content ranking for the user for the given time. Other embodiments of the recommendation module 230 may consider additional factor for identifying content items of interest to the user. For example, content items may be selected based on topic, date of creation, source, media format, or any other suitable feature. The recommendation module 230 provides the recommended content items to the presentation module 240 for presentation to the user.

The presentation module 240 stores instructions for presenting content items generated by the digital server 150 on a client device 130 of a user and facilitates the presentation of content items on the client device 130. In one embodiment, the presentation module 240 receives a selection of one or more content items recommended by the recommendation module 230, generates a personalized digital magazine from the selected content items, and presents the personalized digital magazine to the client device 130 of the user for display. In one embodiment, to generate a personalized digital magazine, the presentation module 240 retrieves the selected content items of the digital magazine from the content store 204, selects a page template from the template store 24 based on the user profile, e.g., type of display of the client device 130 associated with the user, and generates instructions on how to present the generated digital magazine on the client device 130 of the user.

Time-based Content Pattern Matching

Figure 3:
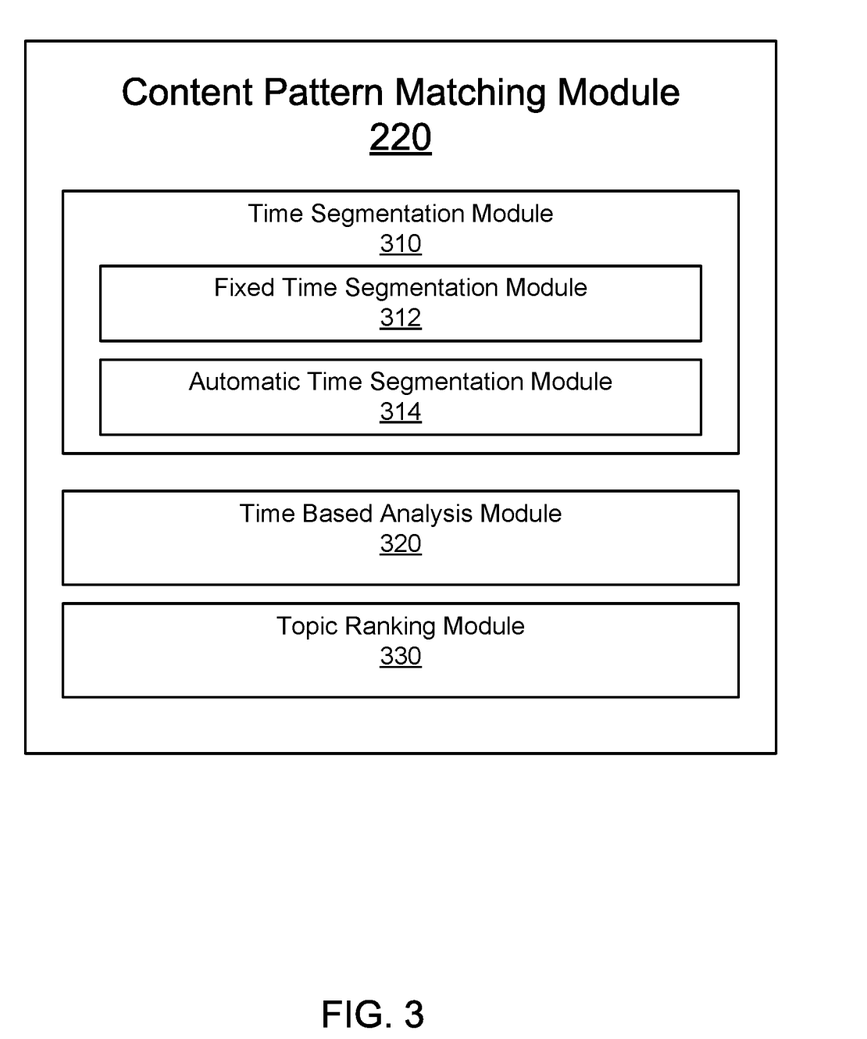
FIG. 3 is a block diagram of an example content pattern matching module, according to one embodiment.

FIG. 3 is a block diagram of an example content pattern matching module 220, according to one embodiment. The content pattern matching module 220 uses data gathered from the user profile store 202 and the reading data store 208 to detect time based content interactions patterns of for a user. A user's content interaction patterns can indicate reading habits of the user (e.g. what topics are of interest to the user) over a period of time. Based on the user's interactions with content over time periods, the content pattern matching module 220 can predict likely topics of interest for a user for a given time in real time. In the embodiment of FIG. 3, the content pattern matching module 220 has a time segmentation module 310, a time based analysis module 320, and a topic ranking module 330. In other embodiments, the content pattern matching module 220 may include additional, fewer, or different entities for various applications.

The time segmentation module 310 segments a time interval into multiple time periods that can later be used to predict topics of interest associated with each time period. This time segmentation is used in detecting time-based patterns of user interactions with content provided by the digital magazine server 150. In one embodiment, the time interval is one day, but the time interval can be any suitable interval over which user-content interaction patterns might be detected. The time segmentation module 310 shown in FIG. 3 includes two sub-modules, a fixed time segmentation module 312 and an automatic time segmentation module 314. In some implementations, these sub-modules operate jointly or in coordination, either concurrently or sequentially.

In some embodiments, the fixed time segmentation module 312 segments a given time interval into predefined time periods of fixed duration. For example, the fixed time segmentation module 312 can segment the time interval of a day into 8 regular 3-hour time periods (midnight to 3 am, 3 am to 6 am, etc.). The fixed time segmentation module 312 can segment the time interval of a week into 7 days, or into 56 3-hour time periods. In another embodiment, the time segmentation by the fixed time segmentation module 312 does not have to be regular and can be based on any suitable rule. For example, the fixed time period segmentation module 312 can segment the time interval of a week into two irregular time periods of a "workweek" consisting of 5 working days of the week, and a "weekend" making up the remaining 2 days of the week. In another example, the fixed time period segmentation module 312 can split the time interval of a day into time periods as follows, an early morning time period from 12:00 am to 6:00 am, a breakfast time period from 6:00 am to 9:30 am, a morning time period from 9:30 am to 11:30 am, a lunch time period from 11:30 am to 1:00 pm, and so on.

The automatic time segmentation module 314 automatically segments a given time interval into multiple time periods based on reading habits data associated with each user stored within the digital magazine server 150, or any other suitable data. Automatic time segmentation can more closely tailor the time period boundaries to each user's individual content interaction patterns, and provide a more accurate reflection of current topics of interest to the user. For each user of the digital magazine server 150, the automatic time segmentation module 314 can segment the time interval of a day into time periods based on the reading habits data for the user over a period of time, e.g., last 7 days. In one embodiment, the reading habits data for a user includes the historical reading data associated with the user and the user's login records and associated timing information. The reading habits data for a user over a period of time can be aggregated to form a distribution over the time interval, and the user's content interaction patterns can be identified from the distribution of the user's reading habits data over the time interval. For example, if a user takes the train home from work at 6:30 pm every evening, the user's reading habits data can show the user logging into a digital magazine application on his/her mobile phone and reading multiple articles every day at around 6:30-6:45. The user's reading habits data indicate that the user interacts with content of the digital magazine while riding the train. The distribution generated from the user's reading habits data can show a corresponding concentration of data points at around 6:30, reflecting the corresponding correlation between the user interactions with content and timing of the user interactions at around 6:30 each day.

In one embodiment, the automatic time segmentation module 314 uses clustering methods to determine the time periods. For example, the automatic time segmentation module 314 can utilize a clustering algorithm to segment user reading habits data stored in the reading data store 208 into multiple defined clusters. In some embodiments, the automatic time segmentation module 314 clusters a user's reading habits data over a specific time interval to detect one or more defined clusters in the user's reading habits data during that time interval. A cluster of user reading habits data can represent a time of concentrated reading activity by the user and the time interval can be segmented into time periods based on the detected clusters. For example, the automatic time segmentation module 314 can segment user reading habits data by applying a hierarchical clustering algorithm to a generated distribution of the historical reading data. The hierarchical clustering algorithm can use distance between points to determine the clusters, such as choosing the two closest points or clusters (with respect to time) and grouping them into a cluster, then iterating on this method with the next closest points until each data point has been assigned to a cluster or other criteria have been met, such as a target number or size of the clusters remaining. In other embodiments, the automatic time segmentation module 314 can use density-based clustering (e.g. DB SCAN) or a K-means clustering algorithm to cluster the reading habits data based on timestamps and topics associated with the reading habits data. Examples of the automatic time segmentation module 314 utilizing clustering methods are further described below in reference to description of FIG. 5 and FIG. 6.

In another embodiment, the automatic time segmentation module 314 uses machine learning models trained based on training data such as the reading habits data and login records of users of the digital magazine server 150. The machine learning models used by the automatic time segmentation module 314 can be trained based on optimization of different types of ranking models for different types of training data. For example, the automatic time segmentation module 314 selects two machine learning models: one for segmenting a time interval based on individual user's reading habits data, and the other for segmenting a time interval based on multiple users' reading habits data. For each individual user of the digital magazine server 150, the automatic time segmentation module 314 selects a machine learning model that is trained based on that particular user's reading habits data including historical reading habits data of the user over a period of time, e.g., over last year. The trained machine learning model for an individual user is personalized for that particular user, which predicts patterns of the individual user's reading activities on various topics with respect of time stamps of the reading activities. Similarly, the automatic time segmentation module 314 selects a machine learning model that is trained based on multiple users' reading habits data offline. Comparing with the machine learning model trained based on individual user's reading habits data, the machine learning model trained based on multiple user's reading habits data can be more accurate but computationally expensive. The machine learning model trained based on multiple users' reading habits data can be used to predict patterns of a group of users' reading activities on various topics with respect of time stamps of the reading activities. In one embodiment, the automatic time segmentation module 314 trains a machine learning model based on recent reading habits data of users. For example, reading habits data newer than a threshold time (e.g., one year) are prioritized over the reading habits data older than the threshold time. Each user reading habits data can be assigned a weight based on its date of creation, with newer reading habits data being assigned a higher weight. A trained machine learning model can be applied by the automatic time segmentation module 314 to a user's reading habits data over a time interval to classify time periods associated with the user's reading habits data.

In one embodiment, both the fixed time segmentation module 312 and the automatic time segmentation module 314 operate jointly to perform the functions of time segmentation module 310. For example, the fixed time segmentation module 312 can segment a time interval into a set number of time periods with defined characteristics or titles (e.g. "morning time period," "lunch time period"), and the automatic time segmentation module 314 can use user reading habits data to determine the exact duration or arrangement of these defined time periods (e.g. Bob logs in around 12:20 pm every day, so the "lunch time period" begins at 12:20 pm). This embodiment can produce a consistent number of time periods per user, but the arrangement, length, and ordering of each time period can differ between users, providing flexible time segmentation for users of the digital magazine server 150.

The time based analysis module 320 analyzes each segmented time period to determine topics of interest for a user within that time period. In one embodiment, each time period is analyzed separately by the time based analysis module 320, based on reading habits data of the user within that time period in previous time intervals. For example, when determining topics of interest for a time period of 1:00 pm to 3:00 pm, the time based analysis module 320 can consider only reading habits data associated with the time period of 1:00 pm to 3:00 pm on previous days. In one embodiment, the time based analysis module 320 sets a threshold period of time, e.g., 2 weeks, and only the reading habits data over the threshold period of time from the current time is used in the analysis by the time based analysis module 320. For example, a time period is defined as 12:20 pm to 1:30 pm daily, and the time based analysis module 320 uses reading habits data from 12:20 pm to 1:30 pm of each day in the past two weeks of the user to determine current topics of interest for the user. In one embodiment, topics of interest for each time period for a user can be determined by recording each topic interacted by the user during that time period in the user's reading habits data. Alternatively, topics can only be selected as a topic of interest if the user has demonstrated a certain level of activity or interactions towards that topic in the user's reading habits data. In yet another embodiment, topics interacted upon by the user more than a threshold amount of times during a time period are considered topics of interest for the user for that time period.

The topic ranking module 330 ranks the topics of interest associated with each time period and generates a ranked list of topics of interest for each time period. Topics may be ranked based on one or more suitable factors of the reading habits data of a user, including a number of times the topic of interest was interacted by the user during the time period, how recently the topic of interest was interacted by the user during the time period, an amount of time spent by the user interacting with the topic of interest, a type of interaction with the topic, or a rate of interaction during the time period. In some embodiments, topics viewed less than a threshold number of times during the given time period are not ranked for that time period. Topics of interest can be ranked based on a single suitable factor, such as ranking topics only by number of articles associated with the topic viewed by the user. When ranking topics of interest based on more than one factor, each factor may be assigned a weight and each weighted factor can be combined to form an overall weighting for the topic. The topic ranking module 330 can also determine relevant statistics of the time period as a whole, including a general usage activity statistic indicating a level of activity of the user within the time period across all topics generally or across all topics of interest.

In one embodiment, the topic ranking module 330 modifies the ranked list of topics of interest for each period based on any other suitable factors. Topic ranking for a time period can be modified based on demographic factors (e.g. gender, age), environmental factors (e.g. current weather, current location, current season), or other suitable outside factors (e.g. sports season, major current events, trending topics) associated with a user. For example, if it is currently basketball season, the topic ranking module 330 may increase the ranking of topics related to basketball. On the other hand, if basketball season has just ended, the topic ranking module 330 can reduce the ranking of topics related to basketball. A modified ranked list of topics of interest for each time period can be stored within the digital magazine server 150 as reading habits data of the user.

Example Graphs of Time Periods with Topic Rankings

Figure 4:
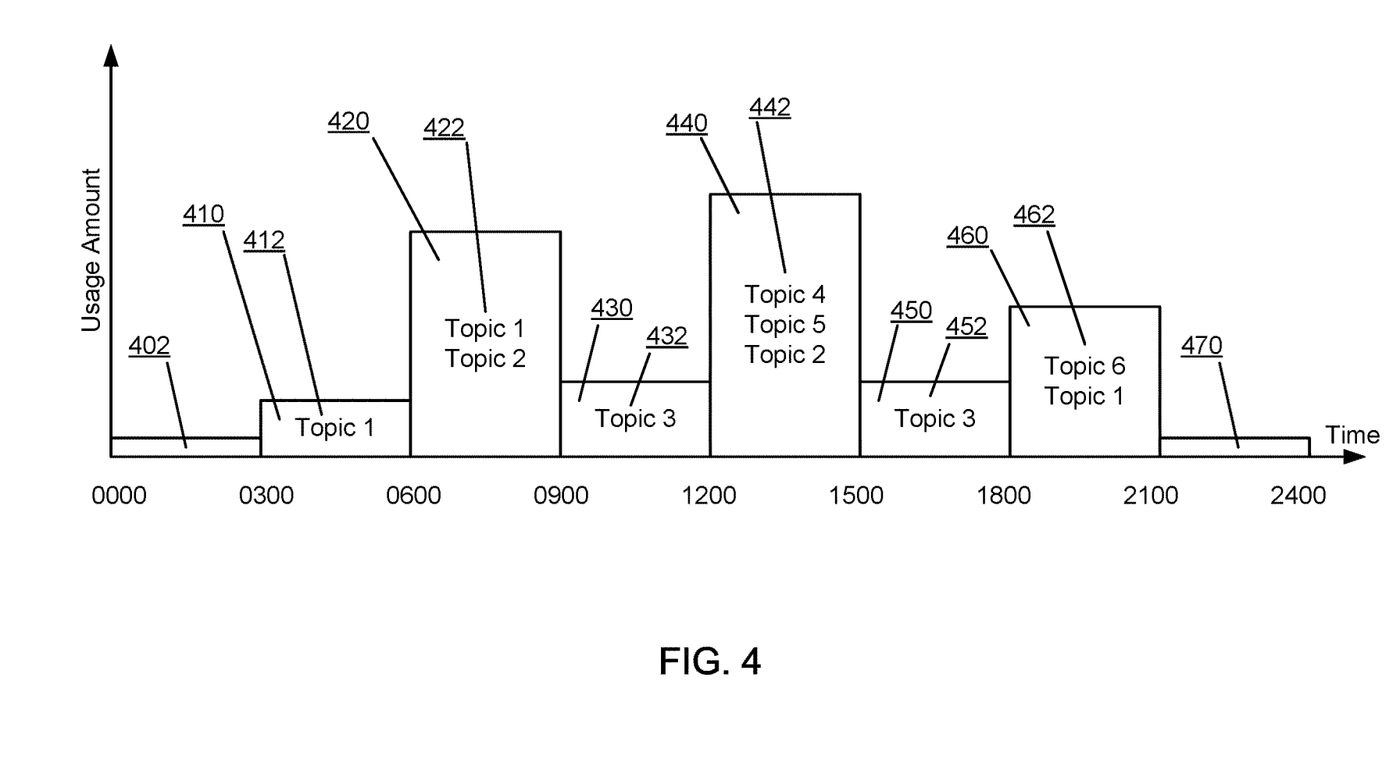
FIG. 4 is a graph of an example relationship between topics of content engaged by a user and fixed time periods of the engaged content, according to one embodiment.

FIG. 4 is a graph of exemplary relationship between topics of content engaged by a user and fixed time periods of the engaged content, according to one embodiment. The horizontal axis represents a time interval of a day, from 00:00 hours (for example, midnight) to 24:00 hours (midnight the next day), and the vertical axis represents a general usage activity during the time period. In the embodiment of FIG. 4, the time interval of a day has been segmented into fixed length time periods 402, 410, 420, 430, 440, 450, 460, and 470, each lasting 3 hours. A time period can be associated with a ranked list of topics of interest. For example, time period 420 is associated with the ranked list of topics of interest 422, containing topic 1 and topic 2; time period 440 is associated with ranked list of topics 442, containing topic 4, topic 5, and topic 2. However, in this embodiment, certain time periods, such as time period 402, are not associated with any topics because there may not be sufficient data to perform an accurate association with topics of interest. In the embodiment of FIG. 4, time period 402 lasts from midnight to 3 am, generally corresponding to a common assumption that users are generally sleeping during this time period, where there is very few or zero user interactions with content for this time period.

In one embodiment, the time periods as shown in the embodiment of FIG. 4 are generated by the fixed time segmentation module 312 using fixed time segmentation by dividing the time interval of a day into 8 time periods of 3 hours each. The time based analysis module 320 analyzes the user's reading habits data within each segmented time period to determine topics of interest for the user within that time period. The topic ranking module 330 ranks the topics within each time period based on the analysis by the time based analysis module 320. In one embodiment, the time based analysis module 320 analyzes the user's reading habits data over past 7 days to identify topics present in a same time period over the past 7 days. From the identified topics for each time period, the topic ranking module 330 counts how many times each identified topic was interacted upon by the user and ranks the topics for each time period.

Taking timing period 440 shown in FIG. 4 as an example, the time based analysis module 320 identifies 3 topics present in the same time period (i.e., time period 440) over the past 7 days, i.e., topic 4, topic 5 and topic 2. The topic ranking module 330 counts how many times each identified topic was interacted upon by the user in the time period 440 and ranks the topics for the time period 440. For example, the user may have read 35 articles associated with topic 4 in the last week during time period 440, and have read 18 articles associated with topic 5 and 10 articles on topic 2, respectively. The user may even have read 1 article associated with topic 3, a topic not present in the topics of interests for the time period 440, during the time period 440. However, 1 interaction over a time period is below a threshold level of interest to be included as a topic of interest. Similar analysis and ranking can be performed for each time period.

Each time period, its associated ranked list of topics of interest, and other related data such as the general usage activity during the time period, can be stored as the user's reading habits data within the digital magazine server 150.

Figure 5:
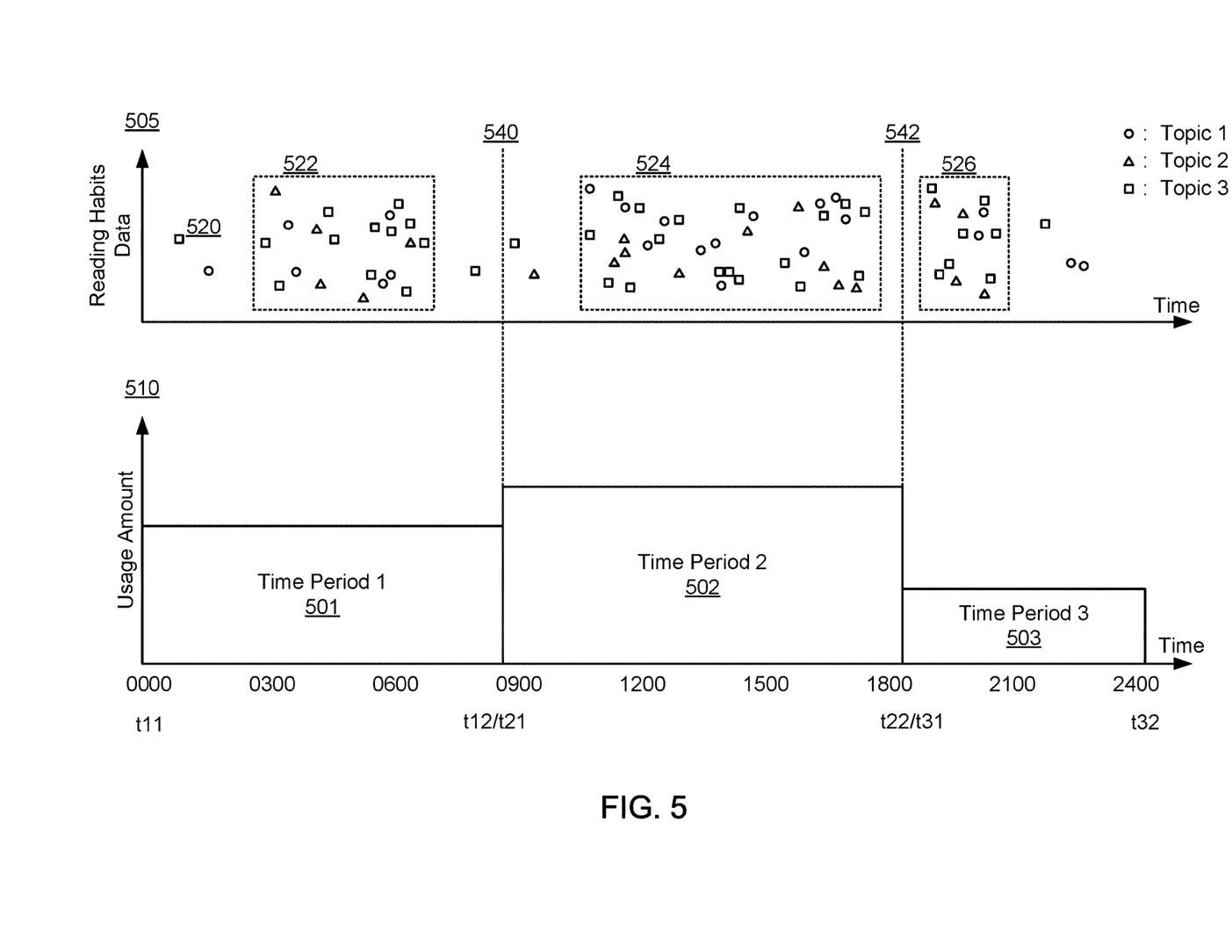
FIG. 5 is a graph illustrating the automatic creation of customized time periods based on a user's reading habits data, according to one embodiment.

FIG. 5 is a graph illustrating the automatic creation of customized time periods generated by the automatic time segmentation module 314 based on a user's reading habits data, according to one embodiment. In the embodiment of FIG. 5, the graph 505 shows a distribution of reading habits data for the user over a time interval, e.g., one day. Historical reading data point 520 and other historical reading data points are organized into a distribution based on time within the day by the automatic time segmentation module 315 using a clustering technique (e.g., a K-Means clustering algorithm). In this embodiment, each historical reading data point is also associated with a topic and the distribution as a whole is made up of data points from many topics. The user's reading habits data is grouped into 3 clusters, 522, 542, and 526, each of which represents a separate area of concentration of user reading activity.

In the embodiment of FIG. 5, time periods 501, 502, and 503 can then be derived by the automatic time segmentation module 314 based on the generated clusters. In one embodiment, the boundaries of a time period can be different than the boundaries of its corresponding cluster. Cluster boundaries can be determined by calculating the earliest and latest times relative to the selected time interval associated with a data points in the cluster, and using this range to delineate the boundaries of the cluster. In some embodiments, each time period's boundaries are the same as the boundaries of the corresponding cluster and extended boundaries of the corresponding cluster. Any cluster boundary delineation known to those of ordinary skill in the art can be used by the automatic time segmentation module 314 to segment a time interval.

In the embodiment of FIG. 5 divisions 540 and 542 represent the boundaries between time period 1 and time period 2; and time period 2 and time period 3; respectively. In some implementations, the mean, midpoint, median, or other suitable indication of the location of each cluster may be determined, and boundaries between time periods can be calculated based on the indication of the locations of the clusters.

Figure 6:
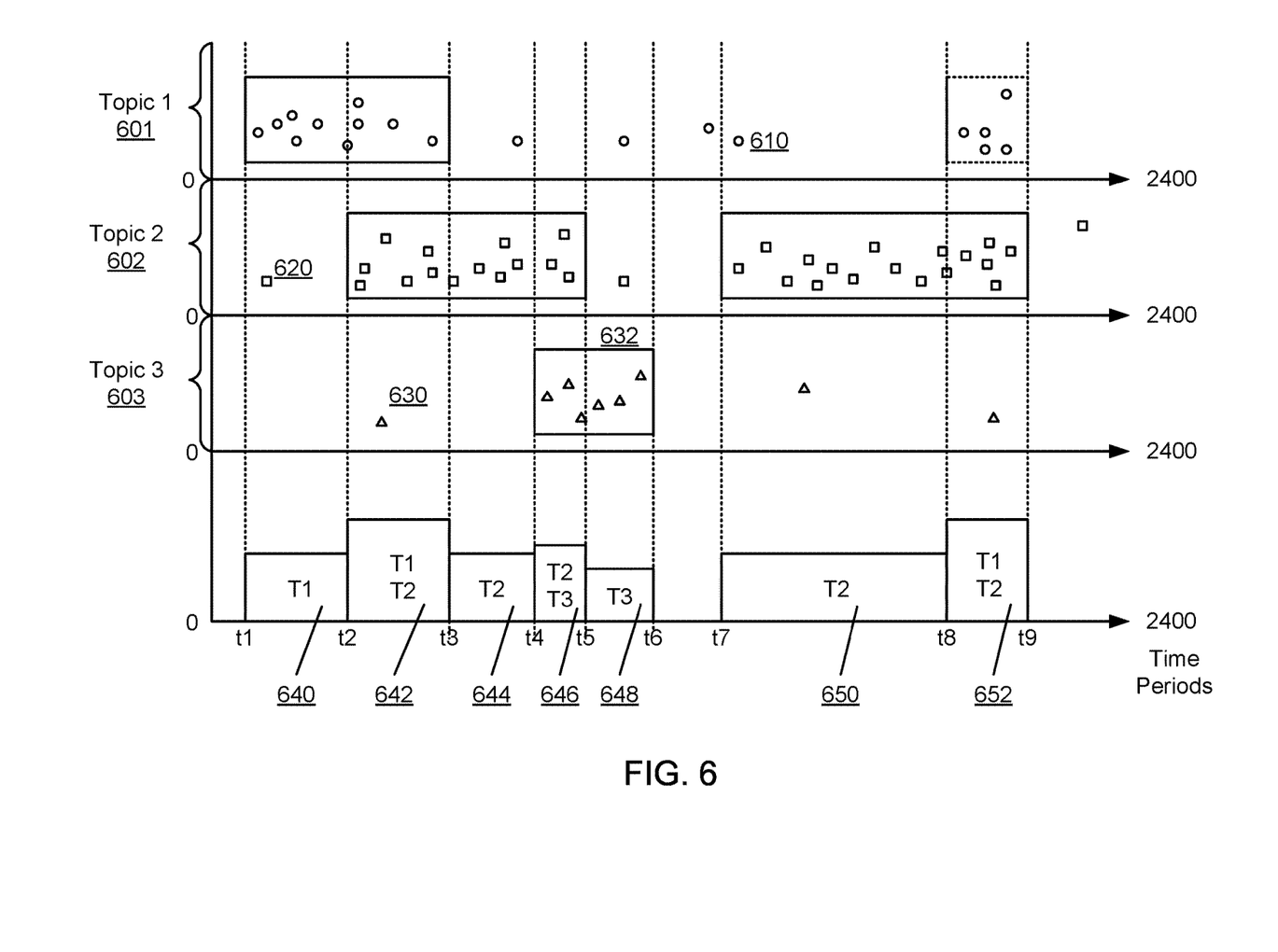
FIG. 6 is a graph illustrating the automatic creation of customized time periods with topic rankings, according to another embodiment.

FIG. 6 is a graph illustrating the automatic creation of customized time periods with topic rankings for a user, according to another embodiment. Comparing with the illustration in FIG. 5, where various topics interacted by a user within a particular time period is shown, FIG. 6 shows the user's interactions with content on a particular topic and the corresponding time periods for such interactions. Topic based clusters (for example the topic cluster 612 associated with topic 1) can be generated using techniques similar to the clustering and machine learning techniques used to generate clusters on a group of various topics as discussed above. As shown in FIG. 6, the horizontal axis of FIG. 6 represents a time interval of one day, from 0000 (midnight) to 2400 (midnight the next day), and the time interval is segmented into 7 time intervals, 640, 642, 644, 646, 648, 650 and 652, by the automatic time segmentation module 314 similar as the segmentation shown in FIG. 5. The user's reading habits data over past 7 days illustrated in FIG. 6 indicate that the user has interacted with contents on 3 topics, topic 1, topic 2 and topic 3. Section 601 represents the user's reading habits data related to topic 1. For example, reading habits data point 610 can represent a single instance in which the user interacted with an article associated with topic 1 at time period 650 on one of the past 7 days. The user's reading habits data illustrated in FIG. 6 also indicates that the user actively interacted on content on topic 1 during the time periods 640 and 642, and time period 652. Similarly, FIG. 6 also shows the distribution of user's interactions with content on topic 2 and their corresponding time periods (e.g., 642, 644, 646, 650 and 652) and the distribution of user's interactions with content on topic 3 and their corresponding time periods (e.g., 646 and 648).

Example Applications

Figure 7:
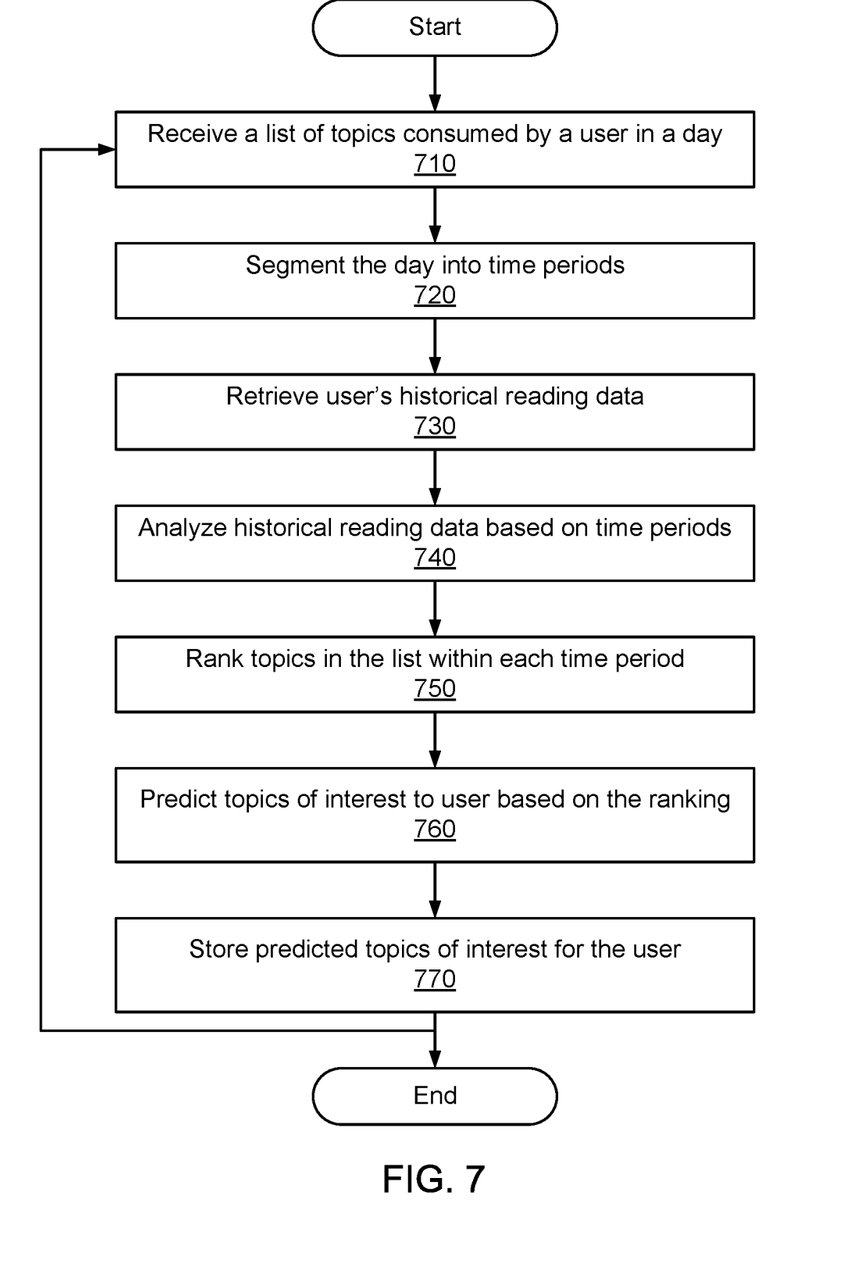
FIG. 7 is a flowchart of a process for predicting topics of interest to a user based on the user's content viewing patterns, according to one embodiment.

FIG. 7 is a flowchart of a process for predicting topics of interest to a user based on the user's content viewing patterns by the digital magazine server 150, according to one embodiment. Initially, the digital magazine server 150 receives 710 a list of topics consumed or interacted by a user in a day. The list of topics can include data associated with each topic entry such as a type and time of each interaction the user has had with the topic. This data may be stored within the reading data store 208. The digital magazine server 150 segments 720 the time interval (i.e., a day) into multiple time periods. As discussed above, this segmentation can be a fixed segmentation into predefined time periods or an automatic segmentation into variable length time periods based on the user's reading habits data. The digital magazine server 150 retrieves 730 and analyzes 740 historical reading data for the user for each time period. The digital magazine server 150 ranks 750 topics in the list for each segmented time period. The digital magazine server predicts 760 topics of interest to the user for each time period based on the rankings and stores 770 the predictions for further processing, such as updating time periods by the automatic time segmentation module 314. The digital magazine server 150 can repeat the steps 710-770 for each day and each user of the digital magazine server 150.

Figure 8:
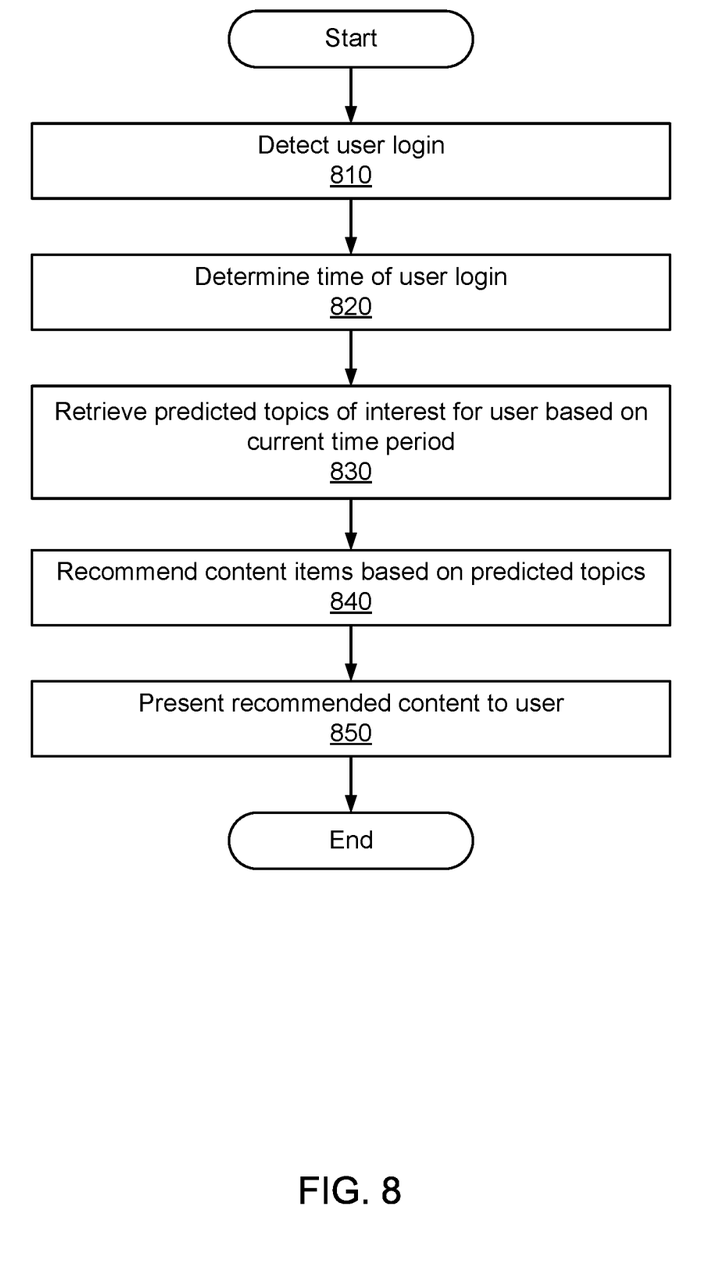
FIG. 8 is a flowchart of a process for presenting content to a user based on predicted topics of interest for a current time period of a user request for content, according to one embodiment.

FIG. 8 is a flowchart of a process for presenting content to a user based on predicted topics of interest for a current time period of a user request for content. Initially, the digital magazine server 150 detects 810 a user login into the digital magazine application running a user's client device 110 and records the login information, such as time of the login. The digital magazine server 150 treats the login as a request for content and determines 820 the time of the login as the current time period of interest to the user, e.g., breakfast time. Based on a determined time of the login, digital magazine server 150 retrieves 830 a previously stored list of topics of interest for that user for the determined time period. This list is a ranked list of topics of interest generated for the current time period stored within the digital magazine server 150. Based on the ranked topics of interest for the user for the current time period, the digital magazine server 150 selects one or more related topics and recommends 840 one or more content items related to the selected topics. The digital magazine server 150 presents to the user the recommended content items in one or more pages of a digital magazine according to a page layout template. Alternatively, the digital magazine server 150 instructs the client device 110 of the user to present the recommended content items in a digital magazine format to the user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implement method comprising:
    receiving user interaction data for a user, the user interaction data comprising a plurality of interaction records describing interactions between the user and content items on a plurality of topics provided by a digital magazine server and a plurality of timestamps each corresponding to an interaction record of the plurality of interaction records;
    generating a distribution of the received user interaction data over a time interval based on the timestamps of the interaction records;
    segmenting the time interval into a plurality of time periods based on the user interaction data, each interaction record being associated with a time period based on the corresponding timestamp indicating the interaction occurring within the associated time period;
    determining, for each time period, one or more likely topics of interest for the user for the time period based on an analysis of the user interaction data associated with the time period, the analysis comprising:
        extracting one or more topics from the interaction records associated with the time period; and
        determining one or more likely topics of interest for the time period by aggregating the extracted topics;
    selecting one or more content items of interest to the user for a current time period of the plurality of time periods based on the determined likely topics of interest associated with the current time period; and sending the selected one or more content items for display to the user during the current time period.

2. The method of claim 1, wherein segmenting the time interval into a plurality of time periods comprises:

dividing the time interval into a plurality of fixed length time periods, each time period having a predefined fixed length of duration.

3. The method of claim 1, wherein segmenting the time interval into a plurality of time periods comprises:

dividing the time interval into a plurality of varying length time periods, each time period having varying length of duration.

4. The method of claim 3, wherein dividing the time interval into a plurality of varying length time periods comprises:

grouping the user interaction data into a plurality of clusters, each cluster having interaction records associated with content items on the plurality of topics, each cluster being defined by a pair of boundaries; and dividing the time interval based on the boundaries of the plurality of clusters.

5. The method of claim 4, wherein dividing the time interval into a plurality of varying length time periods further comprises:

grouping the user interaction data into a plurality of clusters, each cluster having interaction records on content items on a topic of the plurality of topics;

identifying the time periods corresponding to each cluster of the plurality of clusters; and associating the identified time periods with the corresponding clusters on a same topic of the plurality of topics.

6. The method of claim 1, wherein selecting one or more content items of interest to the user for the current time period associated with the time of the request comprises:

selecting a plurality of content items as candidate content items from content items provided by the digital magazine server;

comparing the topics of the selected candidate content items with the likely topics of the interest corresponding to the current time period based on the user interaction data; and selecting one or more content items from the candidate content items in response to a match between the candidate content items and a topic of the likely topics of the interest.

7. The method of claim 6, wherein selecting one or more content items from the candidate content items comprises:

ranking the selected content items; and selecting a threshold number of content items as the content items of interest for the user for the current time period based on the ranking.

8. The method of claim 1, wherein segmenting the time interval into a plurality of time periods further comprises:

receiving historical user interaction data over a predefined period of time, the historical user interaction data indicating a history of user interactions with content items on a plurality of topic over the predefined period of time; and identifying patterns of the historical user interaction data, an identified pattern of historical user interaction data indicating one or more characteristics of reading habits of the user while interacting with the content items associated with the identified pattern.

9. The method of claim 1, wherein content items of interest are selected responsive to a request by the user.

10. The method of claim 1, further comprising:

recording user interactions with content items provided by the digital magazine server, each user interaction with a content item including the topic of the content item, a timestamp of the interaction, and a type of the interaction.

11. A non-transitory computer readable storage medium storing computer program instructions that, when executed by a computer processor, cause the computer processor to perform the steps of:

receiving user interaction data for a user, the user interaction data comprising a plurality of interaction records describing interactions between the user and content items on a plurality of topics provided by a digital magazine server and a plurality of timestamps each corresponding to an interaction record of the plurality of interaction records;

generating a distribution of the received user interaction data over a time interval based on the timestamps of the interaction records;

segmenting the time interval into a plurality of time periods based on the user interaction data, each interaction record being associated with a time period based on the corresponding timestamp indicating the interaction occurring within the associated time period;

determining, for each time period, one or more likely topics of interest for the user for the time period based on an analysis of the user interaction data associated with the time period, the analysis comprising:

extracting one or more topics from the interaction records associated with the time period; and determining one or more likely topics of interest by aggregating the extracted topic;

selecting one or more content items of interest to the user for a current time period of the plurality of time periods based on the determined likely topics of interest associated with the current time period; and sending the selected one or more content items for display to the user during the current time period.

12. The non-transitory computer readable storage medium of claim 11, wherein segmenting the time interval into a plurality of time periods comprises:

dividing the time interval into a plurality of fixed length time periods, each time period having a predefined fixed length of duration.

13. The non-transitory computer readable storage medium of claim 11, wherein segmenting the time interval into a plurality of time periods comprises:

dividing the time interval into a plurality of varying length time periods, each time period having varying length of duration.

14. The non-transitory computer readable storage medium of claim 13, wherein dividing the time interval into a plurality of varying length time periods comprises:

grouping the user interaction data into a plurality of clusters, each cluster having interaction records on content items on the plurality of topics, each cluster being defined by a pair of boundaries; and dividing the time interval based on the boundaries of the plurality of clusters.

15. The non-transitory computer readable storage medium of claim 14, wherein dividing the time interval into a plurality of varying length time periods comprises:

grouping the user interaction data into a plurality of clusters, each cluster having interaction records on content items on a topic of the plurality of topics;

identifying the time periods corresponding to each cluster of the plurality of clusters; and associating the identified time periods with the corresponding clusters on a same topic of the plurality of topics.

16. The non-transitory computer readable storage medium of claim 11, wherein selecting one or more content items of interest to the user for the current time period associated with the time of the request comprises:

selecting a plurality of content items as candidate content items from content items provided by the digital magazine server;

comparing the topics of the selected candidate content items with the likely topics of interest corresponding to the current time period based on the user interaction data; and selecting one or more content items from the candidate content items in response to a match between the candidate content items and a topic of the likely topics of the interest.

17. The non-transitory computer readable storage medium of claim 16, wherein selecting one or more content items from the candidate content items comprises:

ranking the selected content items; and selecting a threshold number of content items as the content items of interest for the user for the current time period based on the ranking.

18. The non-transitory computer readable storage medium of claim 11, wherein segmenting the time interval into a plurality of time periods further comprises:

receiving historical user interaction data over a predefined period of time, the historical user interaction data indicating a history of user interactions with content items on a plurality of topic over the predefined period of time; and identifying patterns of the historical user interaction data, an identified pattern of historical user interaction data indicating one or more characteristics of reading habits of the user while interacting with the content items associated with the identified pattern.

19. The non-transitory computer readable storage medium of claim 11, wherein content items of interest are selected responsive to a request by the user.

20. The non-transitory computer readable storage medium of claim 11, further comprising computer program instructions that, when executed by the computer processor, cause the processor to perform the steps of recording user interactions with content items provided by the digital magazine server, each user interaction with a content item including the topic of the content item, a timestamp of the interaction, and a type of the interaction.

* * * * *

UNITED STATES PATENT AND TRADEMARK OFFICE
CERTIFICATE OF CORRECTION

PATENT NO. : 10,152,547 B2
APPLICATION NO. : 15/017241
DATED : December 11, 2018
INVENTOR(S) : Vaibhav Sharma Page 1 of 1

It is certified that error appears in the above-identified patent and that said Letters Patent is hereby corrected as shown below:

Column 16, Line 37, Claim 11, delete "topic;" and insert --topics;-- therefor.

Signed and Sealed this
Ninth Day of July, 2019

Andrei Iancu
*Director of the United States Patent and Trademark Office*